United States Patent [19]

Kratky et al.

[11] Patent Number: 4,810,512
[45] Date of Patent: Mar. 7, 1989

[54] STABILIZATION OF COLOR OF GREEN VEGETABLES

[75] Inventors: Zdenek Kratky; Dharam V. Vadehra, both of New Milford, Conn.

[73] Assignee: Nestec S.A., Vevey, Switzerland

[21] Appl. No.: 112,221

[22] Filed: Oct. 22, 1987

[51] Int. Cl.$^4$ .............................................. A23L 1/212
[52] U.S. Cl. .................................. 426/270; 426/335; 426/520; 426/615
[58] Field of Search ............... 426/262, 270, 532, 615, 426/335, 520

[56] References Cited

U.S. PATENT DOCUMENTS

| | | | |
|---|---|---|---|
| 2,437,859 | 3/1948 | Moulthrop | 426/270 |
| 2,589,037 | 3/1952 | Bendix | 426/267 |
| 3,652,300 | 3/1972 | Sharma | 426/615 |
| 3,814,820 | 6/1974 | Busta | 426/270 |
| 3,987,208 | 10/1976 | Rahman | 426/532 |
| 4,001,443 | 1/1977 | Dave | 426/262 |
| 4,369,197 | 1/1983 | Basel | 426/615 |
| 4,473,591 | 9/1984 | Segner | 426/270 |
| 4,476,112 | 10/1984 | Aversano | 426/532 |
| 4,521,439 | 6/1985 | Bengtsson | 426/615 |
| 4,701,330 | 10/1987 | Rogers | 426/270 |

*Primary Examiner*—Donald E. Czaja
*Assistant Examiner*—Carolyn Paden
*Attorney, Agent, or Firm*—Vogt & O'Donnell

[57] ABSTRACT

The color of green vegetables is stabilized by heating them in water at a temperature of from 50° C. to 70° C. for from 1 minute to 6 minutes, draining them and then refrigerating them at a temperature from 0° C. to 12° C.

14 Claims, No Drawings

STABILIZATION OF COLOR OF GREEN VEGETABLES

BACKGROUND OF THE INVENTION

The present invention relates to a process for the stabilisation of the colour of green vegetables.

The green colour of vegetables is an extremely desirable culinary attribute in a number of products. This is particularly important in the development of chilled foods. However, the green colour is very sensitive to processing conditions involving heat and acid conditions and under these conditions the green colour can change to an undesirable olive brown colour.

The green colour of the vegetables is due to chlorophyll and this compound or its derivatives can be converted to compounds like pheophytins and pheophorbides which possess an olive brown colour. These conversions are mediated by thermal processing and acid pH conditions. The heating causes tissue damage which makes the chlorophyll molecules accessible to products and components present in the tissues or in the environment. Heat also produces organic acids which then react with the chlorophyll and replace the Mg in the molecule by H and this brings about the change in the colour. In most cases the external environment also has acid and this aggravates matters as far as retention of the green colour is concerned. The use of heat and acid are however very desirable in processing as far as destruction of microorganisms and enzymes is concerned. Low pH will also prevent the growth of the microorganisms.

SUMMARY OF THE INVENTION

We have now found, surprisingly, that the enzyme and microbial problems can be controlled by low temperature processing while still retaining the desirable green colour of the vegetables over a period of several weeks, even at acid pH, for example, when stored in acidic sauces. Our process not only provides a better colour than the traditional process but also a superior texture and flavour.

Accordingly, the present invention provides a process for the stabilisation of the colour of green vegetables which comprises processing the vegetables at a temperature from 50° C. to 70° C. for a period of from 1 to 6 minutes.

Preferably, the vegetables are processed at a temperature from 55° C. to 65° C. and advantageously the processing time is from 2 to 5 minutes.

After processing, the treated vegetables are drained and refrigerated.

The process of the present invention is suitable for any kind of green vegetable, for example, celery, cucumber, cabbage, lettuce, green tomato, peas, beans, green peppers, spinach, sprouts, green beans, zucchini, broccoli and asparagus.

Preferably, before processing, the vegetables are first washed with water, advantageously with agitation and the washing water removed. If desired, the vegetables may be washed a second time. The washing removes extraneous matter and decreases the microbial load.

DESCRIPTION OF PREFERRED EMBODIMENTS

In one advantageous embodiment of this invention, the vegetables may be washed with water containing an effective amount of an antimycotic agent, for example, hydrogen peroxide, chlorine, sorbic acid or benzoic acid for a period of from about 5 to 30 minutes, preferably from 10 to 15 minutes. The hydrogen peroxide is conveniently present in an amount of from 500 to 2000 ppm while the chlorine is conveniently present in an amount from 100 to 200 ppm. The amount of sorbic acid or benzoic acid used may be from 0.1 to 0.5% by weight and preferably from 0.2 to 0.3% by weight based on the total weight of water. When an antimicrobial agent is used, it is desirable to wash the vegetables three times. Conveniently, if feasible, before washing, the vegetables are cut into pieces of the desired size.

After the thermal processing treatment, the vegetables are suitably drained thoroughly, for example, in a strainer and afterwards dried, for example, by air drying. Afterwards, the vegetables may be added to or mixed in dishes or salads containing acidic sauces which may contain ingredients such as sour cream or mayonnaise.

The processed vegetables, either before or after mixing with other dishes or salads, may then be refrigerated at a temperature from 0° to 12° C., more usually from 2° to 10° C. and especially from 4° to 8° C.

The vegetables processed in this manner can retain their colour and microbial stability at pH 5 to 6 for 10 to 17 days when stored at refrigeration temperatures e.g. 4° C. to 8° C. They have a very desirable crisp texture.

Examples

The following Examples further illustrate the present invention.

Example 1

Celery was cut into pieces 1-2 cm long and washed with water under agitation. The washing water was removed and the celery pieces were washed again with fresh water which was afterwards removed.

The celery pieces were then dipped in water containing 1000 ppm of hydrogen peroxide for 15 minutes and then heated at 60° C. for 3 minutes. Afterwards, the celery pieces were drained thoroughly in a strainer and air dried.

The celery pieces were stored at 4°-8° C. in a refrigerator at pH 5.5 for 20 days and after this time they had retained their attractive green colour, had a very desirable crisp texture, and were microbiologically stable.

Comparative Example A

A similar procedure to that described in Example 1 was followed except that the celery pieces were heated at 75° C. After storage under the same conditions, the green colour had faded.

Example 2

Green beans were washed in clean water to remove visual dirt etc. and then cut into 1-3 cm lengths. The cut vegetables were washed in clean water, the water was removed and then the cut vegetables were heated in fresh water at 60° C. for 3 minutes and afterwards drained. The drained vegetables were placed in a salad dressing and stored at 4°-8° C. for 3 weeks after which time they had retained their attractive green colour.

Comparative Example B

A similar procedure to that described in Example 2 was followed except that the cut beans were heated at 100° C. for 1 minute. After storage under the same conditions, the bean pieces became olive brown in colour within 3 days.

We claim:

1. A process for treating green vegetables consisting essentially of heating washed green vegetables in water at a temperature of from 50° C. to 70° C. for a period of from 1 minute to 6 minutes, draining them and then refrigerating them at a temperature of from 0° C. to 12° C. for stabilizing the color of the vegetables.

2. A process according to claim 1 wherein the vegetables are heated in the water at a temperature of from 55° C. to 65° C.

3. A process according to claim 1 or 2 wherein the vegetables are heated in the water for from 2 minutes to 5 minutes.

4. A process according to claim 1 or 2 further consisting essentially of, after draining the vegetables, drying them and then refrigerating them.

5. A process according to claim 1 or 2 further consisting essentially of, before heating the washed vegetables, contacting them with water containing an effective amount of an antimycotic agent for a period of from about 5 minutes to 30 minutes for imparting microbial stability to the vegetables.

6. A process according to claim 5 wherein the water for heating the vegetables is the water containing the antimycotic agent.

7. A process according to claim 5 wherein the water containing the antimycotic agent is removed from the vegetables prior to heating the vegetables in water.

8. A process according to claim 5 wherein the antimycotic agent is selected from a group consisting of hydrogen peroxide, chlorine, sorbic acid and benzoic acid.

9. A process according to claim 4 further consisting essentially of, before heating the washed vegetables, contacting them with water containing an effective amount of an antimycotic agent for a period of from about 5 minutes to 30 minutes for imparting microbial stability to the vegetables.

10. A process according to claim 9 wherein the water for heating the vegetables is the water containing the antimycotic agent.

11. A process according to claim 9 wherein the water containing the antimycotic agent is removed from the vegetables prior to heating the vegetables in water.

12. A process according to claim 9 wherein the antimycotic agent is selected from a group consisting of hydrogen peroxide, chlorine, sorbic acid and benzoic acid.

13. A process according to claim 5 wherein the vegetables are refrigerated in admixture with foodstuffs including acidic sauces.

14. A process according to claim 9 wherein the vegetables are refrigerated in admixture with an acidic sauce.

* * * * *

UNITED STATES PATENT AND TRADEMARK OFFICE
CERTIFICATE OF CORRECTION

PATENT NO. : 4,810,512

DATED : March 7, 1989

INVENTOR(S) : Zdenek KRATKY, et al.

It is certified that error appears in the above-identified patent and that said Letters Patent is hereby corrected as shown below:

Column 2, line 29, "Examples" should be --EXAMPLES-- and centered as a new heading within the column.

Column 3, line 10,
"for stabilizing" should be --to stabilize--.

Column 3, line 25,
"for imparting" should be --to impart--.

Signed and Sealed this

Fifth Day of September, 1989

Attest:

DONALD J. QUIGG

Attesting Officer

Commissioner of Patents and Trademarks